United States Patent
Brown

(10) Patent No.: US 6,950,480 B2
(45) Date of Patent: *Sep. 27, 2005

(54) RECEIVER HAVING AUTOMATIC BURST MODE I/Q GAIN AND PHASE BALANCE

(75) Inventor: James E. C. Brown, San Jose, CA (US)

(73) Assignee: Texas Instruments Incorporated, Dallas, TX (US)

( * ) Notice: Subject to any disclaimer, the term of this patent is extended or adjusted under 35 U.S.C. 154(b) by 120 days.

This patent is subject to a terminal disclaimer.

(21) Appl. No.: 10/350,622

(22) Filed: Jan. 24, 2003

(65) Prior Publication Data

US 2004/0146120 A1 Jul. 29, 2004

(51) Int. Cl.[7] .............................................. H03K 9/00
(52) U.S. Cl. ...................... 375/316; 375/326; 375/322; 375/147; 455/313; 455/296
(58) Field of Search ................. 375/316, 326, 375/322, 147, 235; 455/313, 296; 714/316

(56) References Cited

U.S. PATENT DOCUMENTS

| | | | |
|---|---|---|---|
| 6,330,290 B1 | 12/2001 | Glas | 375/324 |
| 6,377,620 B1 * | 4/2002 | Ozluturk et al. | 375/235 |
| 6,442,217 B1 * | 8/2002 | Cochran | 375/326 |
| 2004/0063416 A1 * | 4/2004 | Kuenen et al. | |
| 2004/0146121 A1 * | 7/2004 | Brown et al. | |

OTHER PUBLICATIONS

Li Yu & W. Martin Snelgrove, "A Novel Adaptive Mismatch Cancellation System for Quadrature IF Radio Receiver", IEEE Transactions On Circuits and Systems —II: Analog and Digital Signal Processing, vol. 46, No. 6, pp. 789–801, Jun., 1999.

Ediz Cetin, Izzet Kale & Richard C. S. Morlin, "Adaptive Compensation of Analog Front–End I/Q Mismatches in Digital Receivers", pp. IV–370 to IV373, IEEE, 2001.

James K. Cavers, & Maria W. Liao, "Adaptive Compensation for Imbalance and Offset Losses in Direct Conversion Tranceivers" IEEE Transactions on Vehicular Technology, vol. 42, No. 4, pp. 581–588, Nov., 1993.

Knog–pang Pun, Jose E. Franca & C. Azeredo–Leme, "Wideband Digital Correction and I and Q Mismatch in Quadrature Radio Receivers", ISCAS 2000—IEEE International Symposium on Circuits and Systems, May 28–31, 2000, pp. V661–V664, Geneva, Switzerland.

Ediz Cetin, Izzet Kale & Richard C. S. Morlin, "On the Structure, Convergence and Performance of an Adaptive I/Q Mismatch Corrector", pp. 2288–2292, IEEE, 2002.

\* cited by examiner

*Primary Examiner*—Shuwang Liu
*Assistant Examiner*—Eva Zheng
(74) *Attorney, Agent, or Firm*—Abdul Zindani; W. James Brady, III; Frederick J. Telecky, Jr.

(57) ABSTRACT

A method and apparatus for balancing I/Q gain and I/Q phase in a signal receiver. The receiver includes an IQ coefficient calculator, an IQ balancer, and a latency time delay device. The latency time delay device delays I and Q signals by a latency time period. During the latency time the IQ coefficient calculator uses the I and Q signals during a section of the packets corresponding to the latency time period for computing correction coefficients. The IQ balancer receives the I and Q signals after the latency time period and applies the correction coefficients to the entire packet of I and Q signals.

10 Claims, 3 Drawing Sheets

RECEIVER HAVING AUTOMATIC BURST MODE I/Q GAIN AND PHASE BALANCE

BACKGROUND OF THE INVENTION

1. Field of the Invention

The invention relates generally to signal receivers having in-phase (I) and quadrature phase (Q) signal processing and more particularly to methods and apparatus for balancing I/Q gain and I/Q phase in a signal receiver.

2. Description of the Prior Art

Most modern radio signal receivers estimate the data that was transmitted by processing in-phase (I) and quadrature phase (Q) signal components. The I and Q signals should have a phase difference (I/Q phase) of 90° at the carrier frequency of the incoming signal and a gain ratio (I/Q gain) of unity. However imperfections in the analog circuitry used in the radio frequency (RF) quadrature downconverters in most modern signal receivers cause the I/Q gain and I/Q phase to be out of balance (I/Q gain not equal to one and I/Q phase not equal to 90°). These imbalances cause a degradation in bit error rate (BER) in estimating the transmitted data.

Existing signal receivers use several methods for correcting I/Q gain and I/Q phase imbalances within the receivers. In one method, an offline test signal is used during manufacture or installation to align the I/Q gain to unity and the I/Q phase to 90° in the signal receiver. However, the performance of the receivers using the test signal method is limited by drift in the analog circuitry after the alignment. This limitation is reduced by performing the alignment periodically during operation. However, the periodic alignment adds overhead that reduces the efficiency of a signal communication channel.

A second method uses an adaptive algorithm that processes the I and Q signals for converging to adjustments to the I and Q signals while the receiver is on-line. However, the BER performance of the receivers using the adaptive algorithm method is degraded because the receiver is estimating the transmitted data during the same on-line time period that the adaptive algorithm is converging. Of course, the adaptive algorithm could be performed on a test signal but this would add overhead and reduce signal efficiency.

Existing receivers using the test signal method or the adaptive algorithm method sometimes use correction coefficients for balancing I/Q gain and I/Q phase of the I and Q signals. However, such receivers that are known determine the I/Q gain and the l/Q phase corrections at points in the signal path that are separated from the RF quadrature downconverter by subsequent downconversion and/or demodulation of the I and Q signals. The performance of such receivers is limited because the imbalances are converted to image signals by the downconversion and/or demodulation and the degradation effect of such image signals cannot be completely eliminated once they are formed.

There is a need for a method for correcting I/Q gain and I/Q phase imbalance in a signal receiver without adding overhead to the signal communication channel and without degrading BER while converging on correction coefficients.

SUMMARY OF THE INVENTION

It is therefore an object of the present invention to provide a method and apparatus in a signal receiver for balancing I/Q gain and I/Q phase by computing correction coefficients for I and Q signals of an on-line operational incoming signal during a latency time period that is created within the receiver.

Briefly, in a preferred embodiment, the signal receiver of the present invention includes an IQ coefficient calculator, an IQ balancer, and a time delay device. The delay device delays I and Q signals by a latency time period. The latency time period corresponds to an IQ measurement section that is defined within the receiver for a packet of the I and Q signals. The IQ coefficient calculator uses the I and Q signals in the IQ measurement section for computing fixed correction coefficients for that packet. The IQ balancer receives the I and Q signals after the latency time period so that the correction coefficients may be applied to the entire packet of I and Q signals.

Advantages of the present invention are that no test signal is required, no communication overhead is added, and the correction coefficients are determined without degrading BER during the determination time period.

These and other objects and advantages of the present invention will no doubt become obvious to those of ordinary skill in the art after having read the following detailed description of the preferred embodiments which are illustrated in the various figures.

IN THE DRAWINGS

DETAILED DESCRIPTION OF THE PREFERRED EMBODIMENTS

Figure 1:
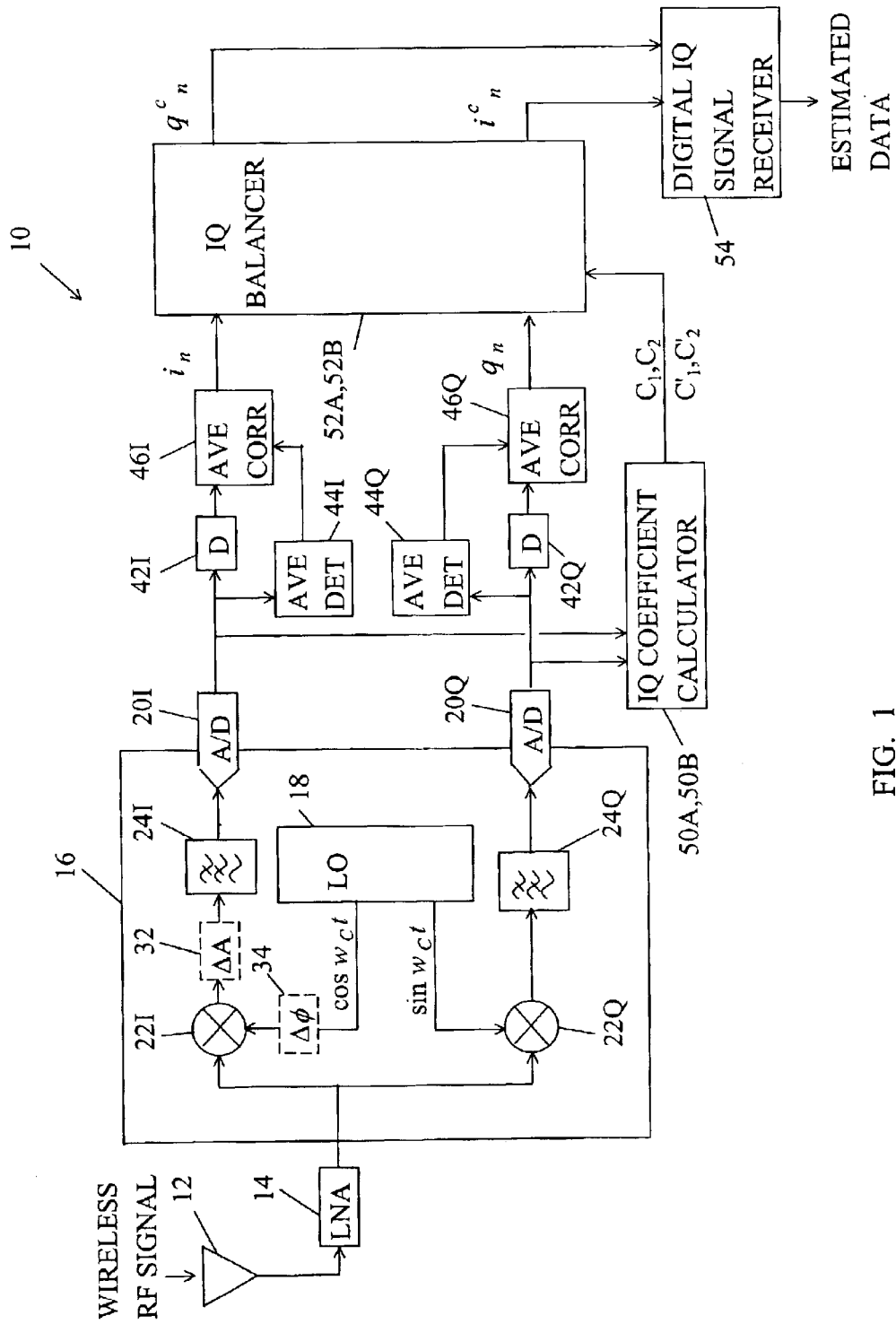
FIG. 1 is a block diagram of a signal receiver of the present invention.

FIG. 1 is a block diagram of a signal receiver 10 of the present invention. The receiver 10 includes an antenna 12, a low noise amplifier (LNA) 14, a quadrature downconverter 16 including a local oscillator system (LO) 18, and in-phase (I) and quadrature (Q) phase digital-to-analog converters (A/D)s 20I and 20Q. The antenna 12 converts a wireless radio frequency (RF) signal into a conducted form and passes the conducted RF signal to the LNA 14. The LNA 14 amplifies the conducted signal and passes an amplified RF signal to the quadrature downconverter 16. The quadrature downconverter 16 splits the amplified RF signal into in-phase (I) and quadrature phase (Q) signals that are processed in analog I and Q channels, respectively. The analog I channel includes an I mixer 22I, an I lowpass filter 24I, the analog portion of the A/D 20I, and associated hardware such as amplifiers, matching elements and additional filters. Similarly, the analog Q channel includes a Q mixer 22Q, a Q lowpass filter 24Q, the analog portion of the A/D 20Q, and associated hardware such as amplifiers, matching elements and additional filters.

The LO 18 generates an in-phase (I) LO signal, denoted as $\cos w_c t$, and a quadrature phase (Q) LO signal, denoted as $\sin w_c t$, and passes the I and Q LO signals to the I and Q mixers 22I and 22Q, respectively. The I and Q mixers 22I and 22Q use the I and Q LO signals to frequency downconvert the amplified RF signal from the LNA 14. The I and Q filters 24I and 24Q filter the I and Q downconverted signals to provide intermediate I and Q signals to the I and Q A/Ds 20I and 20Q, respectively. The carrier frequency of the intermediate I and Q signals may be baseband (zero frequency), near to but not exactly zero frequency, or some other frequency that is intermediate between the RF frequency and zero frequency depending upon other system considerations.

The quadrature downconverter 16 has an I/Q gain imbalance (error) 32 represented by ΔA and an I/Q phase imbalance (error) 34 represented by Δϕ. It should be noted that the I/Q gain error ΔA 32 and the I/Q phase error Δϕ 34 are not actual blocks in the block diagram of the quadrature downconverter 16, but are instead representations of imperfections in the quadrature downconverter 16. It is this I/Q gain error ΔA 32 and this I/Q phase error Δϕ 34 that the receiver 10 of the present invention corrects before the received signal is frequency converted again and/or demodulated in order to estimate the transmitted data.

The I/Q gain error ΔA 32 results in a gain ratio (I/Q gain) different than unity between an effective gain for the I signal and an effective gain for the Q signal. The effective gain for the I signal is the signal gain from the point at which the amplified signal from the LNA 14 is split into the I and Q signal components in the quadrature downconverter 16 until the point at which the intermediate I signal is converted to a digital form in the A/D 20I. The effective gain of the Q signal is the signal gain from the point at which the amplified RF signal from the LNA 14 is split into the I and Q signal components in the quadrature downconverter 16 until the intermediate Q signal is converted to a digital form in the A/D 20Q.

Similarly, it should be noted that the I/Q phase imbalance (error) Δϕ 34 results in a relative phase (I/Q phase) that is different than 90° between the effective phase of the I signal that is digitized by the A/D 20I and the effective phase of the Q signal that is digitized by the Q A/D 20Q. The relative phase (I/Q phase) includes the phase of the I signal LO cos $w_c t$ relative of the phase of the Q LO signal sin $w_c t$ and the effective signal phase shift from the point at which the amplified signal is split into I and Q signal components until the point at which the intermediate I signal is converted to a digital form in the A/D 20I relative to the effective signal phase shift from the point at which the amplified signal is split into I and Q signal components until the point at which the intermediate Q signal is converted to a digital form in the A/D 20Q.

The receiver 10 also includes I and Q latency time delay devices 42I and 42Q, optional I and Q average detectors 44I and 44Q, optional I and Q average correctors 46I and 46Q, an IQ coefficient calculator 50A or 50B, an IQ balancer 52A or 52B, and a digital IQ signal receiver 54. The I and Q delay devices 42I and 42Q, the I and Q average detector 44I and 44Q, and the IQ coefficient calculator 50A,B receive the digital I and Q signals from the I and Q A/Ds 20I and 20Q, respectively. After a certain number N of digital sample indexes n, equivalent to a latency time delay D where D equals N times the digital sample time for the indexes n, the I and Q delay devices 42I and 42Q reissue the digital I and Q signals to the I and Q average correctors 46I and 46Q.

Typically, the digital I and Q signals are received as packets (FIG. 3) and the index N (FIG. 3) is equal of some portion of the total number of indexes n that are used for sampling one packet. The index N may be varied from 100% to 5% or even less of the total number of indexes n depending upon system considerations. Increasing the index N increases latency and decreases noise in the corrections. Decreasing the index N decreases latency and increases noise in the corrections. Preferably, the index N is about 10% to 30% of the total number of indexes n. For example, for a packet having a total number 942 of sample indexes n, the index N may be 192.

The I and Q average detectors 44I and 44Q use the number N of indexes n to calculate the averages for the digital I and Q signals, respectively, and pass I and Q average corrections to the I and Q average correctors 46I and 46Q. The I and Q average correctors 46I and 46Q use the I and Q average corrections based upon the first N of the indexes n for removing DC offset from digital I and Q signals for the entire packet from beginning to end. The IQ balancer 52A,B receives the zero average digital I and Q signals, denoted $i_n$ and $q_n$, respectively, from the I and Q average correctors 46I and 46Q. In an alternative embodiment, the delayed I and Q signals are passed directly to the IQ balancer 52A,B and the averaging is performed further downstream in the digital IQ signal receiver 54.

Figure 3:
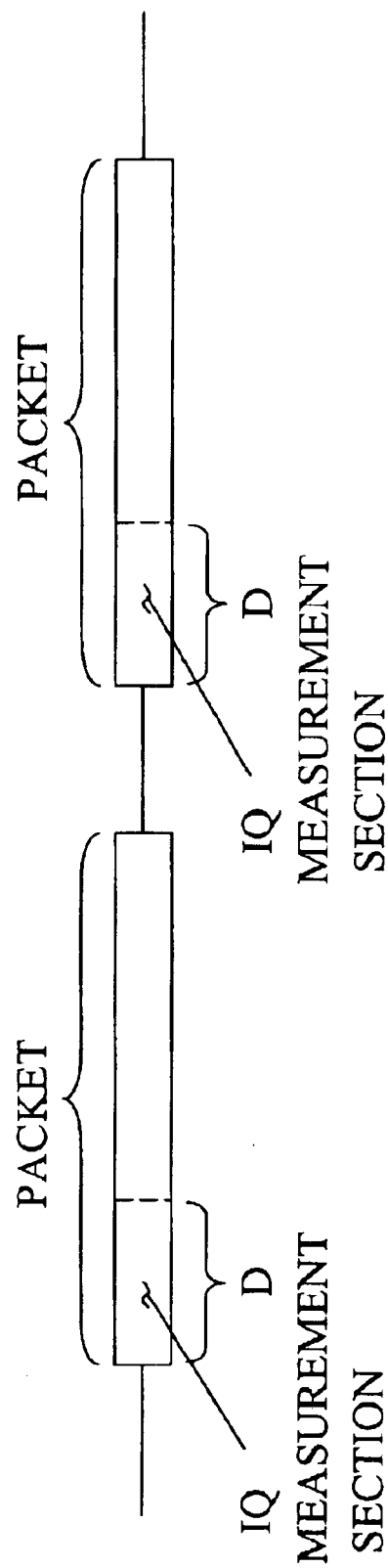
FIG. 3 is a time chart of a packet received by the receiver of FIG. 1.

The first N of the indexes n of the digital I and Q signals from the A/Ds 20I and 20Q are selected or defined as an IQ measurement section (FIG. 3) of the packet (FIG. 3). The IQ coefficient calculator 50A,B uses the first N of the n indexes to calculate first and second correction coefficients. The first and second correction coefficients correspond roughly to phase and gain correction coefficients. In a first embodiment, the IQ coefficient calculator 50A calculates a first correction coefficient $C_1$ and a second correction coefficient $C_2$ as described in equations 1 and 2, below. In a second embodiment, the IQ coefficient calculator 50B calculates a first correction coefficient $C'_1$ and a second correction coefficient $C'_2$ as described in equations 3 and 4, below.

$$C_1 = \frac{\sum_{n=1}^{N} |q_n|}{\sum_{n=1}^{N} \left| i_n - q_n \left( \sum_{n=1}^{N} i_n q_n \bigg/ \sum_{n=1}^{N} q_n q_n \right) \right|} \quad (1)$$

$$C_2 = -\sum_{n=1}^{N} i_n q_n \bigg/ \sum_{n=1}^{N} q_n q_n \quad (2)$$

$$C'_1 = \frac{\sum_{n=1}^{N} |q_n|}{\sum_{n=1}^{N} \left| i_n - q_n \left( \sum_{n=1}^{N} i_n q_n \bigg/ \sum_{n=1}^{N} q_n q_n \right) \right|} \quad (3)$$

$$C'_2 = \frac{-\sum_{n=1}^{N} |q_n| \left( \sum_{n=1}^{N} i_n q_n \bigg/ \sum_{n=1}^{N} q_n q_n \right)}{\sum_{n=1}^{N} \left| i_n - q_n \left( \sum_{n=1}^{N} i_n q_n \bigg/ \sum_{n=1}^{N} q_n q_n \right) \right|} \quad (4)$$

The IQ balancer 52A,B uses the first and second correction coefficients $C_1$ and $C_2$ (or $C'_1$ and $C'_2$) to balance and correct the digital I and Q signals $i_n$ and $q_n$ in order to provide corrected digital I and Q signals, denoted as $i^c_n$ and $q^c_n$. The corrected digital I and Q signals $i^c_n$ and $q^c_n$ are passed to the digital IQ signal receiver 54. The digital IQ signal receiver 54 includes synchronization, demodulation, equalization, and bit detection subsystems for estimated the data that was carried by the wireless RF signal.

Figure 2B:
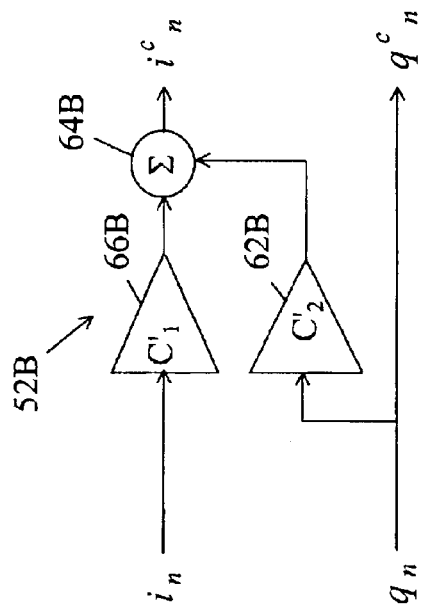
FIGS. 2A and 2B are first and second embodiments, respectively, of IQ balancers of the receiver of FIG. 1.
Figure 2A:
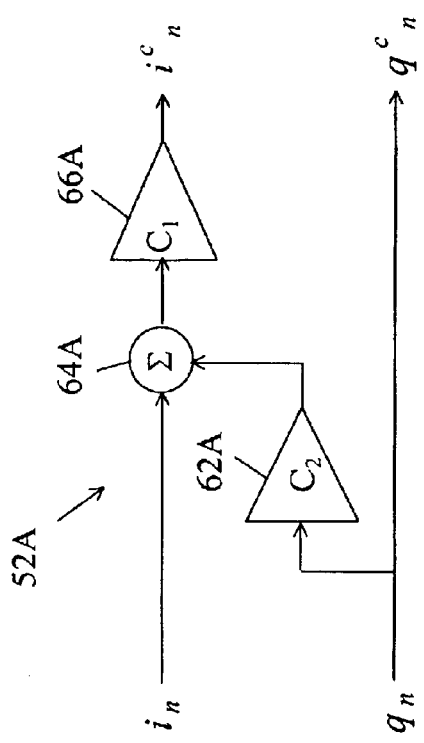

FIGS. 2A and 2B are functional block diagrams of first and second embodiments of the IQ corrector 52A and 52B, respectively. The first embodiment IQ corrector 52A includes a phase balancer 62A, a summer 64A, and a gain balancer 66A. The phase balancer 62A multiplies the Q signal $q_n$ by the second coefficient $C_2$ to provide a phase correction signal $C_2 * q_n$ to the summer 64A. The summer 64A adds the phase correction signal $C_2^*q_n$ to the I signal $i_n$ and passes the sum $C_2^*q_n+i_n$ to the gain balancer 66A. The gain balancer 66A multiplies the sum $C_2^*q_n+i_n$ by the first coefficient $C_1$ to provide the corrected I signal $i^c{}_n=C_1^*(C_2^*q_n+i_n)$. The Q signal $q_n$ is passed straight through as the corrected Q signal $q^c{}_n$. Of course, the processing of the I and Q signals $i_n$ and $q_n$ could be exchanged.

Similarly, the second embodiment IQ corrector 52B includes a phase balancer 62B, a summer 64B, and a gain balancer 66B. The phase balancer 62B multiplies the Q signal $q_n$ by the second coefficient $C'_2$ and provides a phase correction signal $C'_2^*q_n$ to the summer 64B. The gain balancer 66B multiplies the I signal $i_n$ by the first coefficient $C'_1$ and provides an amplitude correction signal $C'_1^*i_n$ to the summer 64B. The summer 64B adds the phase correction signal $C'_2^*q_n$ to the amplitude correction digital $C'_1^*i_n$ and provides the corrected I signal $i^c{}_n=C'_1^*i_n+C'_2^*q_n$ as the sum. The Q signal $q_n$ is passed straight through as the corrected Q signal $q^c{}_n$. Of course, the processing of the I and Q signals $i_n$ and $q_n$ could be exchanged.

Simple algorithms for computing the correction coefficients in the IQ coefficient calculator 50A,B are described with the aid of equations 5–12.

$$K_1 = \sum_{n=1}^{N} i_n q_n \quad (5)$$

$$K_2 = \sum_{n=1}^{N} q_n q_n \quad (6)$$

$$K_3 = \frac{K_1}{K_2} \quad (7)$$

$$K_4 = \sum_{n=1}^{N} |q_n| \quad (8)$$

$$K_5 = \sum_{n=1}^{N} |i_n - K_3 q_n| \quad (9)$$

$$C_1 = C'_1 = \frac{K_4}{K_5} \quad (10)$$

$$C_2 = -K_3 \quad (11)$$

$$C'_2 = -C'_1 K_3 \quad (12)$$

The IQ coefficient calculator 50A,B computes the correction coefficients using the following algorithm: Given a vector of finite length N with indexes n for indexed I elements $i_n$ and an equal length vector of indexed Q elements $q_n$, let a first term $K_1$ equal the dot product (cross correlation) of the $i_n$ elements and the $q_n$ elements, let a second term $K_2$ equal a dot product (autocorrelation) of the $q_n$ elements and the $q_n$ elements, let a third term $K_3$ equal the quotient of the first term $K_1$ divided by the second term $K_2$, let a fourth term $K_4$ equal the sum of the absolute values of the $q_n$ elements, let Z be a vector of elements representing the $i_n$ elements minus the product of the $q_n$ elements times the third term $K_3$, and finally let a fifth term $K_5$ equal a sum of the absolute values of the Z elements.

For the first embodiment where the IQ balancer 52A corrects I and Q signals according to $i^c{}_n=C_1^*(C_2^*q_n+i_n)$ and $q^c{}_n=q_n$, the IQ coefficient calculator 50A computes the first correction coefficient $C_1$ equal to the fourth term $K_4$ divided by the fifth term $K_5$ and computes the second correction coefficient $C_2$ equal to the negative of the third term $K_3$.

For the second embodiment where the IQ balancer 52B corrects the I and Q signals according to $i^c{}_n=C'_1^*i_n+C'_2^*q_n$ and $q^c{}_n=q_n$, the coefficient calculator 50B computes the first correction coefficient $C'_1$ equal to the fourth term $K_4$ divided by the fifth term $K_5$ and computes the second correction coefficient $C'_2$ equal to the negative of the product of the first coefficient $C'_1$ times the third term $K_3$.

It should be understood that it is equivalent to exchange the processing of the $i_n$ and $q_n$ vectors for the equivalent result in the first embodiment and in the second embodiment.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method for balancing in-phase (I) and quadrature phase (Q) signals in a signal receiver, comprising:

resolving an incoming signal into said I and Q signals;

computing fixed correction coefficients from said I and Q signals for a certain time period of said incoming signal;

after said certain time period, correcting I/Q gain and I/Q phase of said I and Q signals with said correction coefficients for providing corrected said I and Q signals; and wherein:

the step of computing fixed correction coefficients includes computing first and second correction coefficients using a finite number of indexed I values for said I signal and said finite number of indexed Q values for said Q signal; where a first term includes a cross correlation of said I values and said Q values;

a second term includes an autocorrelation of said Q values;

a third term includes said first term divided by said second term;

a fourth term includes a sum of absolute values of said Q values;

a fifth term includes a sum of absolute values of difference values, said difference values including said I values minus product values, said product values including said Q value times said third term; and said first correction coefficient includes said fourth term divided by said fifth term.

2. The method of claim 1, wherein:

said second correction coefficient includes the negative of said third term.

3. The method of claim 1, wherein:

said second correction coefficient includes a negative of a product of said first correction coefficient and said third term.

4. A method for balancing in-phase (I) and quadrature phase (Q) signals in a signal receiver, comprising:

resolving an on-line incoming signal into said I and Q signals;

computing fixed correction coefficients from said I and Q signals for a certain time period of said incoming signal;

after said certain time period, correcting I/Q gain and I/Q phase of said I and Q signals with said fixed correction coefficients for providing corrected said I and Q signals;

delaying said I and Q signals by at least said certain time period, the step of correcting including correcting said I/Q gain and said I/Q phase of said delayed I and Q signals with said correction coefficients for providing said corrected I and Q signals;

detecting pre-delay averages for said I and Q signals for a time period not greater than said certain time period before the step of delaying said I and Q signals; and using said pre-delay averages for reducing DC offset from said delayed I and Q signals.

5. A signal receiver having automatic balancing of in-phase (I) and quadrature phase (Q) signals, comprising:

a quadrature converter for resolving an incoming signal into said I and Q signals;

an IQ coefficient calculator for computing fixed correction coefficients from said I and Q signals for a certain time period of said incoming signal;

an IQ balancer for using said correction coefficients for correcting I/Q gain and I/Q phase of said I a Q signals after said certain time period and providing corrected said I and signals; and wherein:

the IQ coefficient calculator computes first and second said correction coefficients using a finite number of indexed I values for said I signal and said finite number of indexed Q values for said Q signal; where a first term includes a cross correlation of said I values and said Q values;

a second term includes an autocorrelation of said Q values;

a third term includes said first term divided by said second term;

a fourth term includes a sum of absolute values of said Q values;

a fifth term includes a sum of absolute values of difference values, said difference values including said I values minus product values, said product values including said Q value times said third term; and said first correction coefficient includes said fourth term divided by said fifth term.

6. The receiver of claim 5, wherein:
said second correction coefficient includes the negative of said third term.

7. The receiver of claim 5, wherein:
said second correction coefficient includes a negative of a product of said first correction coefficient and said third term.

8. A signal receiver having automatic balancing of in-phase (I) and quadrature phase (Q) signals, comprising:

a quadrature converter for resolving an on-line incoming signal into said I and Q signals;

an IQ coefficient calculator for computing fixed correction coefficients from said I and Q signals for a certain time period of said incoming signal;

an IQ balancer for using said fixed correction coefficients for correcting I/Q gain and I/Q phase said I and Q signals and providing corrected said I and Q signals;

I and Q delay devices for delaying said I and Q signals by at least said certain time period, the IQ balancer using said correction coefficients for correcting said I/Q gain and I/Q phase of said delayed I and Q signals for providing said corrected I and Q signals;

an average detector for detecting pre-delay averages for said I and Q signals for a time period not greater than said certain time period before delaying said I and Q signals; and an average corrector for using said pre-delay averages for correcting averages of said delayed I and Q signals.

9. A method for balancing in-phase (I) and quadrature phase (Q) signals in a signal receiver, comprising:

resolving an on-line incoming signal into said I and Q signals;

computing fixed correction coefficients from said I and Q signals for a certain time period of said incoming signal;

after said certain time period, correcting I/Q gain and I/Q chase of said I and Q signals with said fixed correction coefficient for providing corrected said I and Q signals; and wherein:

the step of resolving an incoming signal includes resolving packets of said incoming signal into corresponding packets of said I and Q signals;

the step of computing fixed correction coefficients includes computing sets of said correction coefficients for said packets of said I and Q signal, said sets corresponding to said packets, respectively, of said I and Q signals;

the step of correcting I/Q gain and I/Q phase includes correcting said I/Q gain and said I/Q phase of said I and Q signals with paid sets of said correction coefficients for providing packets of said corrected said I and Q signals corresponding to said incoming signal packets, respectively;

the step of correcting said I/Q gain and I/Q phase further includes correcting said I/Q gain and I/Q phase for the entire time period of said packets using said fixed correction coefficients computed during said certain time period of said packets; and said certain time period is in the range of 10% to 30% of said packets.

10. A signal receiver having automatic balancing of in-phase (I) and quadrature phase (Q) signals, comprising:

a quadrature converter for resolving an on-line incoming signal into said I and Q signals;

an IQ coefficient calculator for computing fixed correction coefficients from said I and Q signals for a certain time period of said incoming signal;

an IQ balancer for using said fixed correction coefficients for correcting I/Q gain and I/Q phase of said I and Q signal and providing corrected said I and Q signals; and wherein:

the quadrature converter resolves packets of said incoming signal into corresponding packets of aid I and Q signals;

the IQ coefficient calculator computes set of said correction coefficients for said packets of said I and Q signals, said sets corresponding to said packets, respectively, of said I and Q signals;

the IQ balancer corrects said I/Q gain and I/Q phase of said I and Q signals with said sets of said correction coefficients for providing packets of said corrected said I and Q signals corresponding to said incoming signal packets, respectively;* the IQ balancer corrects said I/Q am and I/Q phase for the entire time period of said packets using said fixed correction coefficients computed during said certain time period of aid packets; and said certain time period is in the range of 10% to 30% of said packets.

* * * * *